United States Patent
Roy

(10) Patent No.: US 10,589,423 B2
(45) Date of Patent: Mar. 17, 2020

(54) ROBOT VISION SUPER VISOR FOR HYBRID HOMING, POSITIONING AND WORKSPACE UFO DETECTION ENABLING INDUSTRIAL ROBOT USE FOR CONSUMER APPLICATIONS

(71) Applicant: Shambhu Nath Roy, Roseville, CA (US)

(72) Inventor: Shambhu Nath Roy, Roseville, CA (US)

( * ) Notice: Subject to any disclaimer, the term of this patent is extended or adjusted under 35 U.S.C. 154(b) by 72 days.

(21) Appl. No.: 16/010,629

(22) Filed: Jun. 18, 2018

(65) Prior Publication Data

US 2019/0381660 A1 Dec. 19, 2019

(51) Int. Cl.
| | | |
|---|---|---|
| G05B 19/04 | (2006.01) | |
| G05B 19/18 | (2006.01) | |
| B25J 9/16 | (2006.01) | |
| A47J 36/00 | (2006.01) | |
| B25J 15/00 | (2006.01) | |
| B25J 11/00 | (2006.01) | |

(52) U.S. Cl.
CPC ............. *B25J 9/1666* (2013.01); *A47J 36/00* (2013.01); *B25J 9/1697* (2013.01); *B25J 11/0045* (2013.01); *B25J 15/0009* (2013.01)

(58) Field of Classification Search
CPC .... B25J 9/1666; B25J 15/0009; B25J 9/1697; B25J 11/0045; A47J 36/00
See application file for complete search history.

(56) References Cited

U.S. PATENT DOCUMENTS

| | | | | |
|---|---|---|---|---|
| 4,517,593 A | * | 5/1985 | Keller | F41J 5/10 348/139 |
| 4,831,549 A | * | 5/1989 | Red | B25J 9/1692 700/254 |
| 4,998,442 A | * | 3/1991 | Brown | B23Q 1/012 74/422 |
| 5,561,742 A | * | 10/1996 | Terada | B25J 9/1669 700/249 |
| 6,468,021 B1 | * | 10/2002 | Bonora | H01L 21/67706 198/468.6 |
| 6,681,151 B1 | * | 1/2004 | Weinzimmer | B25J 9/1697 219/121.85 |
| 8,181,596 B2 | * | 5/2012 | Ishikawa | G03B 27/32 118/50 |
| 9,513,635 B1 | * | 12/2016 | Bethke | G01C 21/20 |
| 10,012,735 B1 | * | 7/2018 | Loveland | G01S 19/48 |
| 10,025,886 B1 | * | 7/2018 | Rublee | G01B 11/254 |

(Continued)

*Primary Examiner* — Khoi H Tran
*Assistant Examiner* — Jorge O Peche

(57) ABSTRACT

A robot vision supervisor system for use with industrial robots being placed with average home consumers or at restaurants that is capable of guiding the robot to its homing position for initial homing or when a loss of reference has occurred. Further the robot vision supervisor is able to detect presence of unidentified foreign objects in the workspace and guide the robot to navigate around and prevent collisions. Image processing algorithms are used with primary, orthogonal and cross camera arrays to increase reliability and accuracy of the robot vision supervisor. Lookup tables of images are captured and stored by controller for discretized positions in the full robot workspace when robot is in known good calibration to compare with images during regular operation for detecting anomalies.

8 Claims, 6 Drawing Sheets

(56) References Cited

U.S. PATENT DOCUMENTS

| | | | | |
|---|---|---|---|---|
| 10,094,131 | B1* | 10/2018 | Garcia | E04H 6/12 |
| 10,213,884 | B2* | 2/2019 | Kogushi | B25J 9/0096 |
| 2001/0000062 | A1* | 3/2001 | Ostwald | G11B 15/6805 |
| | | | | 104/88.02 |
| 2002/0103571 | A1* | 8/2002 | Yoo | H01L 21/67796 |
| | | | | 700/228 |
| 2003/0096426 | A1* | 5/2003 | Little | B01J 19/0046 |
| | | | | 506/32 |
| 2004/0144759 | A1* | 7/2004 | Cho | B23K 37/0235 |
| | | | | 219/86.7 |
| 2006/0063599 | A1* | 3/2006 | Greenspan | B25J 9/1697 |
| | | | | 473/1 |
| 2007/0115362 | A1* | 5/2007 | Sasaki | H04N 5/232 |
| | | | | 348/207.99 |
| 2007/0134078 | A1* | 6/2007 | Rogers | H01L 21/67769 |
| | | | | 414/281 |
| 2007/0196197 | A1* | 8/2007 | Ishiyama | G11B 15/6835 |
| | | | | 414/281 |
| 2008/0192381 | A1* | 8/2008 | Minemura | G11B 15/6885 |
| | | | | 360/137 |
| 2008/0250636 | A1* | 10/2008 | Okuda | H05K 13/041 |
| | | | | 29/834 |
| 2008/0257268 | A1* | 10/2008 | Gudmundsson | A01J 5/0175 |
| | | | | 119/14.08 |
| 2009/0033908 | A1* | 2/2009 | Matsumoto | G01B 7/003 |
| | | | | 355/75 |
| 2009/0320753 | A1* | 12/2009 | Yoshino | B05B 13/0431 |
| | | | | 118/315 |
| 2010/0087955 | A1* | 4/2010 | Tsusaka | B25J 9/0003 |
| | | | | 700/245 |
| 2012/0060539 | A1* | 3/2012 | Hunt | A01N 1/0236 |
| | | | | 62/336 |
| 2012/0152877 | A1* | 6/2012 | Tadayon | B25J 5/02 |
| | | | | 212/224 |
| 2013/0151004 | A1* | 6/2013 | Winter | G01N 1/42 |
| | | | | 700/218 |
| 2013/0345718 | A1* | 12/2013 | Crawford | A61B 17/7082 |
| | | | | 606/130 |
| 2014/0012420 | A1* | 1/2014 | Yasue | G05B 19/18 |
| | | | | 700/264 |
| 2014/0229005 | A1* | 8/2014 | Suzuki | B25J 9/1692 |
| | | | | 700/254 |
| 2014/0316616 | A1* | 10/2014 | Kugelmass | G05D 1/101 |
| | | | | 701/8 |
| 2015/0251321 | A1* | 9/2015 | Ishikawa | B25J 15/0047 |
| | | | | 294/183 |
| 2015/0274421 | A1* | 10/2015 | Yamada | B65G 1/0492 |
| | | | | 700/218 |
| 2015/0290795 | A1* | 10/2015 | Oleynik | B25J 9/0081 |
| | | | | 700/257 |
| 2015/0300931 | A1* | 10/2015 | Dockrill | G01N 1/312 |
| | | | | 435/30 |
| 2016/0059412 | A1* | 3/2016 | Oleynik | B25J 9/163 |
| | | | | 700/257 |
| 2016/0088287 | A1* | 3/2016 | Sadi | G03B 35/08 |
| | | | | 348/43 |
| 2016/0104046 | A1* | 4/2016 | Doettling | F16M 11/105 |
| | | | | 382/103 |
| 2016/0253808 | A1* | 9/2016 | Metzler | G05D 1/0094 |
| | | | | 382/103 |
| 2016/0288329 | A1* | 10/2016 | Hashimoto | B23P 19/105 |
| 2017/0192418 | A1* | 7/2017 | Bethke | G05D 1/0094 |
| 2017/0235018 | A1* | 8/2017 | Foster | B64C 39/024 |
| | | | | 702/5 |
| 2017/0336806 | A1* | 11/2017 | Blanc-Paques | G08G 5/045 |
| 2018/0002010 | A1* | 1/2018 | Bauer | G08G 5/0034 |
| 2018/0093380 | A1* | 4/2018 | Yoshida | B25J 5/007 |
| 2018/0199853 | A1* | 7/2018 | Abkai | A61B 5/0555 |
| 2018/0259652 | A1* | 9/2018 | Shimizu | G01S 17/89 |
| 2018/0313861 | A1* | 11/2018 | Takai | G01N 35/026 |
| 2019/0000569 | A1* | 1/2019 | Crawford | A61B 5/064 |
| 2019/0048980 | A1* | 2/2019 | Muser | B66F 9/07 |
| 2019/0056746 | A1* | 2/2019 | Jia | B25J 11/0005 |
| 2019/0088025 | A1* | 3/2019 | Tamanaha | H04N 5/00 |
| 2019/0145778 | A1* | 5/2019 | Huang | G01C 21/20 |
| | | | | 701/3 |
| 2019/0186631 | A1* | 6/2019 | Lee | F16H 61/28 |
| 2019/0213381 | A1* | 7/2019 | Lee | G06F 21/32 |
| 2019/0269223 | A1* | 9/2019 | Harding | B25J 9/043 |

* cited by examiner

ROBOT VISION SUPER VISOR FOR HYBRID HOMING, POSITIONING AND WORKSPACE UFO DETECTION ENABLING INDUSTRIAL ROBOT USE FOR CONSUMER APPLICATIONS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention generally relates to use of industrial pick and place robots or assembly robots for use in homes or restaurants such as in a robotic robot vision supervisor without requiring expert robot technicians to conduct services and maintenance activities as done in a factory setup.

A need exists for industrial quality robots suitable for use by average home consumers as disclosed in U.S. Pat. No. 9,643,324 for use in a robot vision supervisor for automated home cooking as disclosed in U.S. Pat. No. 9,131,807.

Industrial robots are calibrated using homing and limit sensors from time to time or routinely which are also part of preventative maintenance schedules. Anytime a robot is unable to carry a pick and place or assembly activity or hits an obstacle in its motion path, a failure is detected, reported by operators or anomalies like a dropped or missing part in the next step of a manufacturing process or an over torque fault on a motor when robot end effector has an unexpected hit or runs into an obstacle.

Any such failure events result in summoning of a skilled operator or a maintenance technician who is trained in homing the robot's axes by manually guiding the robot axes to their home position and recalibrating using the home sensors as they may be out of calibration or robot controller lost their coordinates due to motions caused by outside forces as in a collision including belt slips, clutch slips, permanently deflected structural members. A technician may use any means to guide the robot back to its homing positions but use their senses including eyes to make sure that the robot does not run into any additional issues in the process of homing. Once homed the technician may also manually guide the robot to conduct some of its tasks usually in a teach mode often using a teach pendant or a joystick device to confirm it's corrected and in good health.

When an industrial robot is placed into a home for use by average home consumers or restaurants as necessitated due to the desired tasks like cooking requiring industrial grade systems as opposed to some other robotic toys, any events such as a collision can render the product out of order and users will need to call a qualified service technician. A collision can occur when say a home user places an Unidentified Foreign Object or an UFO into the motion path of the robot or its end effector. Further such events will occur on a frequent basis at homes due to use in a relatively uncontrolled task environment with unskilled users as opposed to in a disciplined industrial floor with only trained users interacting with the robots. Even a single failure event on a weekly basis will cause the pick and place robots extremely expensive to own and operate negating their use and adoption.

A need therefore exists to provide a vision system for supervising an industrial robot for use with home consumer robots by eliminating the need of frequent calls to service technicians when the robot goes out of calibration due to unforeseen events such as a collision of robot end effector with a foreign object or UFO in its workspace.

Further, a need exists for a robot vision supervisor that can guide back the axes of the robot back to its home position to use the home calibration sensors for accurate recalibration from time to time to verify health of its positioning capability. Further the home use robot vision supervisor can check the position errors after a failure to detect health of overall positioning and if any damage was occurred.

BRIEF SUMMARY OF THE INVENTION

The present invention provides a robot vision supervisor that can help guide a robot to its home position working with a robot controller or computer and help in homing calibration without the need for an expert operator or technician to guide it manually.

An object of the invention is to use cameras and image processing to extract the boundaries of a robot workspace and compare with the boundaries of the robot moving parts and end effectors to prevent collisions and guide the robot to its homing position when needed.

Yet another object of the invention is use this robot vision supervisor to continuously watch the robot to compute is current positions based on images captured and compare to that expected by the controller to detect any loss of referencing. To notify the controller of any such errors and help recover from loss of references.

An object of the invention is to detect any unidentified foreign objects other than known objects in the workspace to prevent collisions with robot moving parts and notify the controller of these UFOs raising an alarm for the user to rectify by removing such UFOs from workspace.

A further object of the invention is to use only a primary and a secondary orthogonal cameras to compute all positions along all axes.

According to an embodiment of the invention, arrays of primary and secondary cameras are used to improve visual position computation accuracy over large workspaces in comparison to camera's field of view.

According to another embodiment of the invention, an image lookup table is generated against all position and orientation combinations discretized with a selected minimum measurement unit conducted when the robot controller is known to work accurately to use for comparison when robot is in regular operation later.

Additional features and advantages of the present invention are described in, and will be apparent from, the detailed description of the preferred embodiments and from the drawings.

BRIEF DESCRIPTION OF THE SEVERAL VIEWS OF THE DRAWING

The following is a description, by way of example only, of different embodiments of the mechanism, its variations, derivations and reductions.

DETAILED DESCRIPTION OF THE INVENTION

Figure 1:
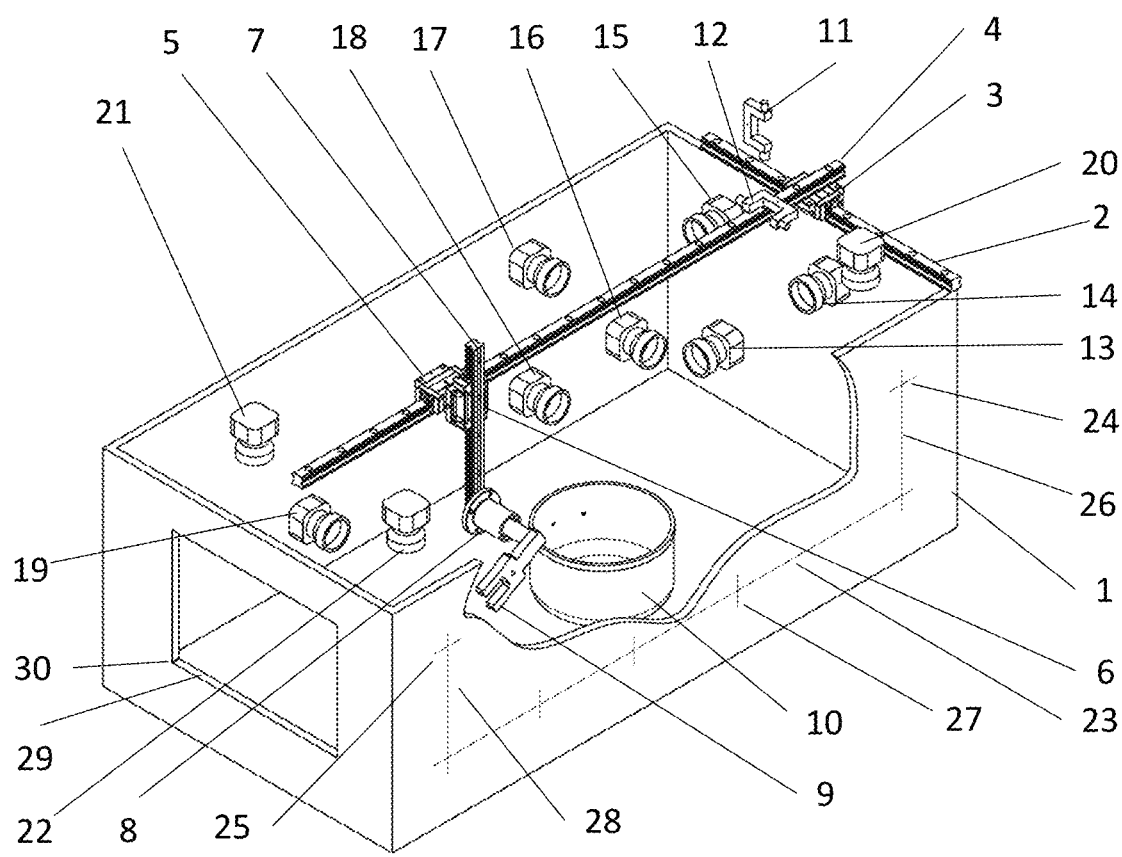
FIG. 1 shows a robot vision supervisor watching over a 4-axis robot.

Now referring to the drawings, wherein like numerals designate like components, FIG. 1 shows a robot vision supervisor watching over a 4-axis robot by way of example. A frame 1 is a stationary member and is the reference for all motion and positioning coordinates. A first degree of freedom along y-axis defined as back to front is achieved by a first carriage guide 3 moving along a first guide rail 2, a second degree of freedom along x-axis defined as going from left to right is achieved by a second carriage guide 5 moving along a second guide rail 4 fixed to first carriage guide 3, a third degree of freedom long z-axis defined as pointing up is achieved by a guide rail 7 moving across a carriage guide 6 fixed to second carriage guide 5. A fourth degree of freedom along a tilt axis is achieved by fixing a rotational joint 8 on third guide rail 7 and mounting an end effector 9 to rotational joint 8. The end effector 9 is able to translate along x, y and z axes and tilt along the axis of the rotational joint 8. A known workspace object 10 sits at the bottom of the robot workspace.

A robot vision supervisor comprised of one or plural primary direction cameras 13, 14, 15 fixed to frame 1, viewing along x-axis. One or plural orthogonal direction cameras 15, 16, 17, 18 mounted on frame 1 viewing in a direction perpendicular to primary direction cameras along y-axis and one of plural third cross cameras 20, 21, 22 mounted on the roof, mounting structure not shown for clarity, also fixed with reference to frame 1 viewing in a mutually perpendicular direction to viewing directions or primary and orthogonal direction cameras. Robot vision supervisor is also assisted by one or plural fixed primary reference marks 23, 24, 25 on frame 1, one or plural secodary reference marks 26, 27, 28 on frame 1, a cutout feature 29 and a corner feature 30 on frame 1.

The 4-axis robot is operated using a robot motion controller directing it to go to different positions and orientations as needed to perform its tasks. Each axis may be comprised of motion transmission elements including motors, encoders, belts, pulleys, clutches as is known in the art. When the robot is first started a homing sequence is run where each robot axis is manually guided to a home position where a sensor trips letting the controller know it has reached a designated origin or home position. As seen in FIG. 1 y-home optical sensor 11 is tripped when guide rail 4 moves into a position that blocks an optical beam from one of its ends to reach a photo sensor on the other side. A second x-home optical sensor 12 is mounted on second guide rail 4 and is tripped when guide rail 7 moves to home and trips it. The home sensors can be optical or mechanical limit switches or like. The home sensors for the z-axis and tilt-axis have not been shown for clarity. Once the robot is homed the controller asks it to go to other positions relative to this home position fixed with reference to frame 1. For open loop control the controller remembers all the requests it made and computes the current position of the end effector based on assumption that all past motion was achieved accurately and successfully. Any errors unknown to the controller will keep compounding resulting in desired positions be other than what is requested or commanded by robot. In case of closed loop controllers encoders are used which may also measure any resulting errors and keep adjusting the actual position but not able to adjust for belt slips, backlashes, deflections and others that do not impact at the encoders.

Figure 2:
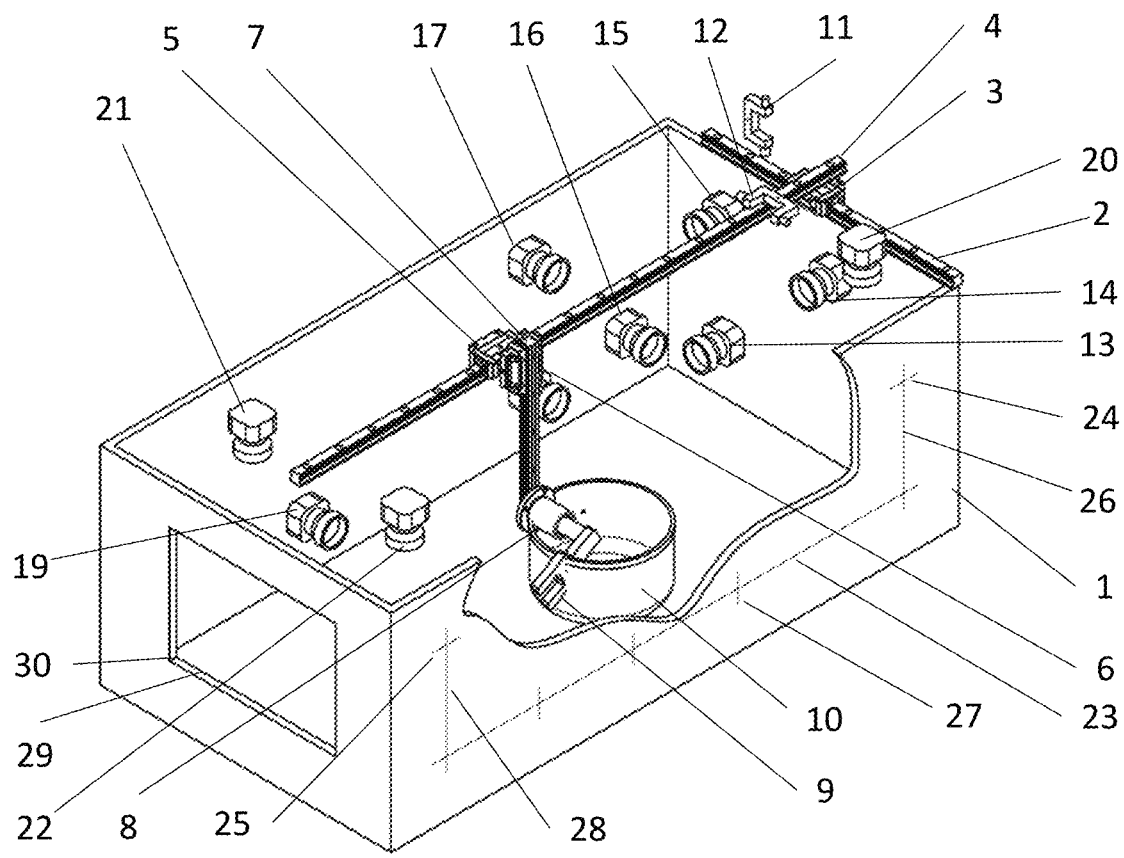
FIG. 2 shows a robot end effector crashing into a known workspace object while trying to move after losing its sense of position relative to known reference frame.
Figure 3:
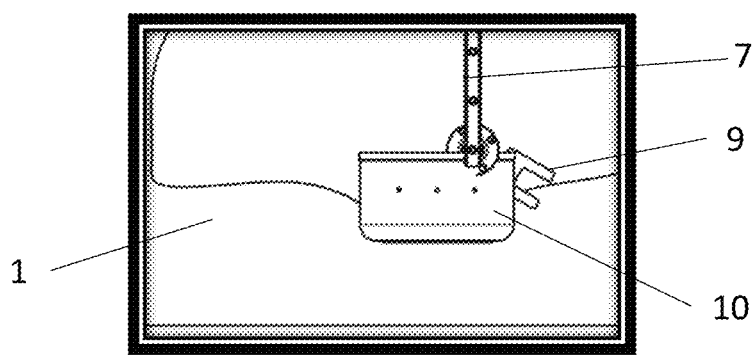
FIG. 3 shows a view of this crash as seen by one of the cameras of the consumer robot vision supervisor.

Once a robot is homed it can successfully move around the workspace doing tasks. It can also go around known workspace objects or obstacles as the programmers would be aware of such obstacles and program the motion path around it. This is based on the condition that the robot is sincerely following all the motion commands and no errors or drifts are building up. Sometimes an event such as a power failure can erase the current positions in controller memory as can be seen in FIG. 2 when the robot has drifted or lost its current positions and needs to be homed but runs into a known workspace object 10 while approaching home position. In such a case a technician needs to be present to guide the robot to its home and repeat the homing procedure when a robot vision supervisor is not used. The robot vision supervisor can predict this collision as seen in FIG. 3 viewed by orthogonal camera 18 by extracting a silhouette of the known workspace object 10 and a silhouette of the end effector 9 and guide the end effector 9 such that the workspace object silhouettes and the robot silhouettes do not meet.

Figure 4:
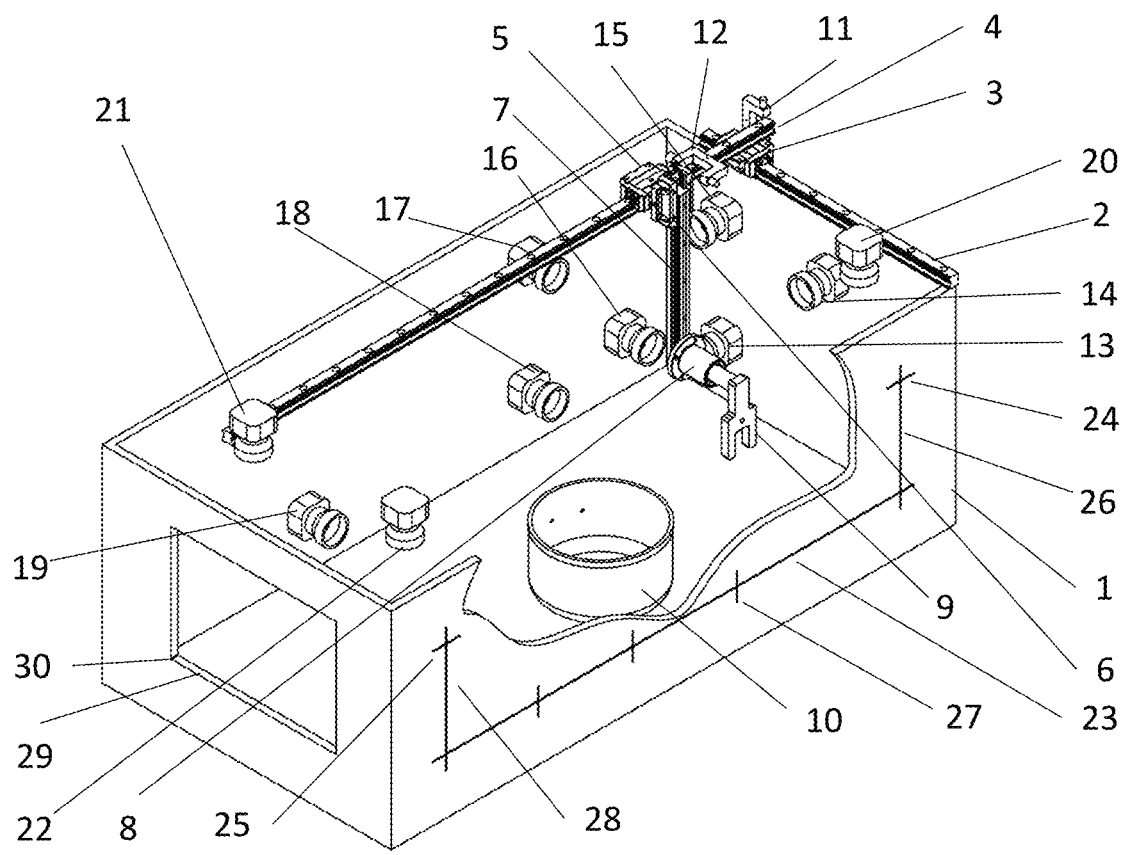
FIG. 4 shows the end effector of a 4 axis robot in its home position.
Figure 5:
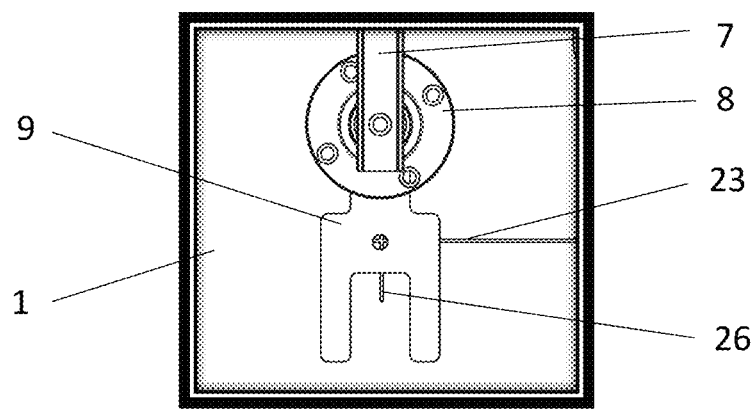
FIG. 5 shows a view of the end effector of the robot as seen by a camera of the home robot vision supervisor.

FIG. 4 shows the robot in home position where the orthogonal camera 16 can compare its orientation by extracting boundary features of end effector 9 and comparing to reference features 23 and 26. The robot vision supervisor can guide the end effector in a position by minimizing the errors using the view as seen by camera 16 with image processing and bring it close to the homing position where a fine homing can be done using the traditional homing sensors. This hybrid vision and traditional homing eliminates the need for a technician to be present for manual observance and guidance. Based on the positioning accuracy requirements the traditional homing sensors can be ignored or eliminated from the system.

Figure 6:
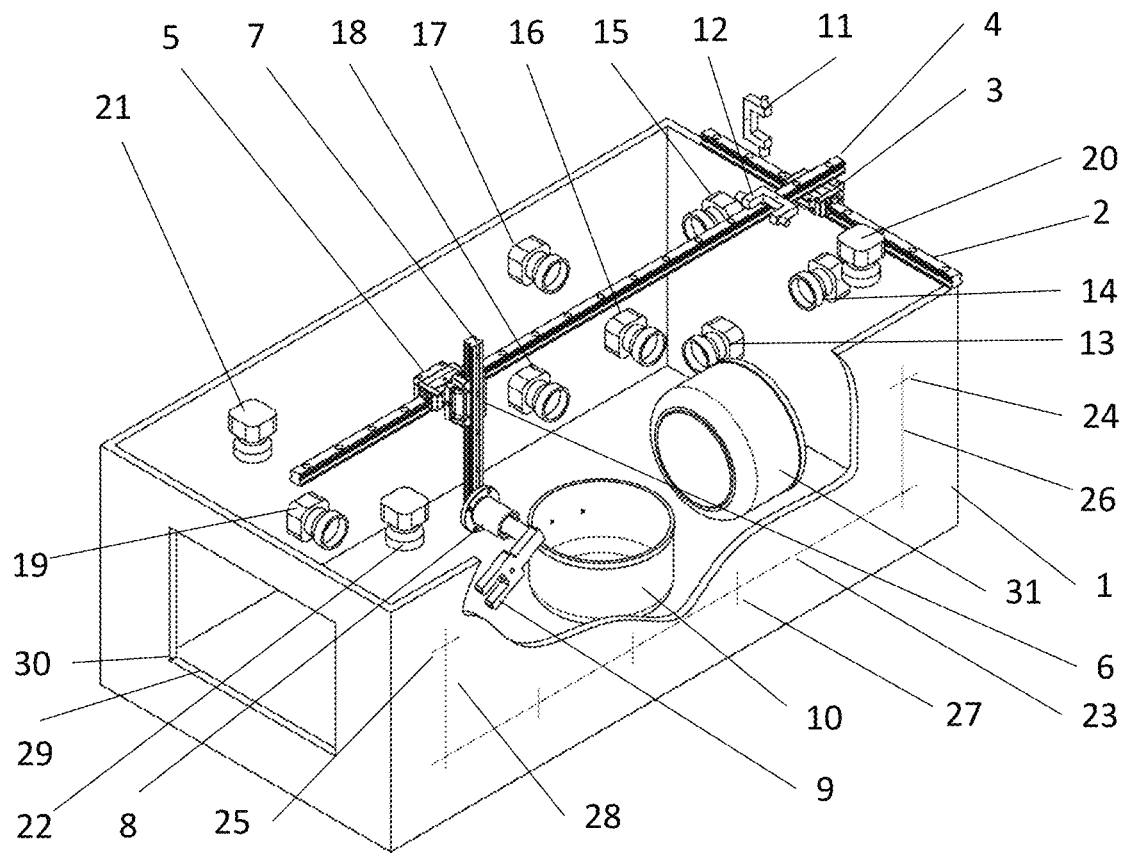
FIG. 6 shows an unidentified foreign object or UFO appearing in the robot workspace which was not expected by the workspace state based robot control system.
Figure 7:
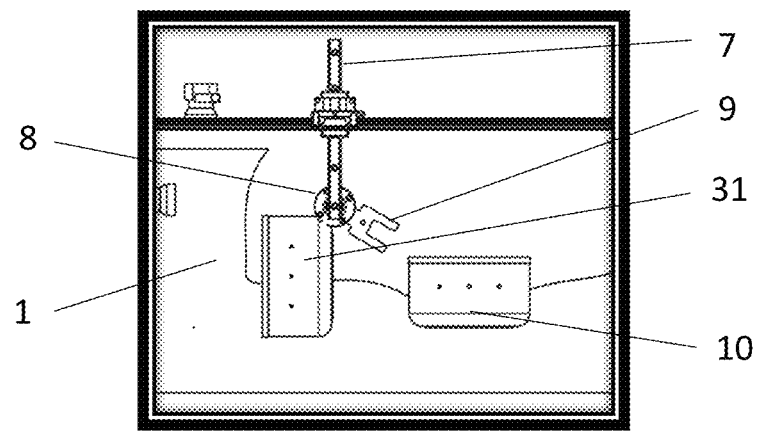
FIG. 7 shows the view of a crash as seen by one of the cameras of the robot vision supervisor when the robot was set in a motion by the controller above the known workspace object but hit the UFO.

FIG. 6. shows a robot that has not lost its position reference however ran into an unidentified foreign object or UFO which was left by an user but unknown to the controller. The robot vision supervisor camera 16 can predict this as seen in FIG. 7 by image processing and identifying workspace object boundaries. This unexpected object boundary can allow the controller to raise an alarm to notify about an UFO in the workspace.

Figure 8:
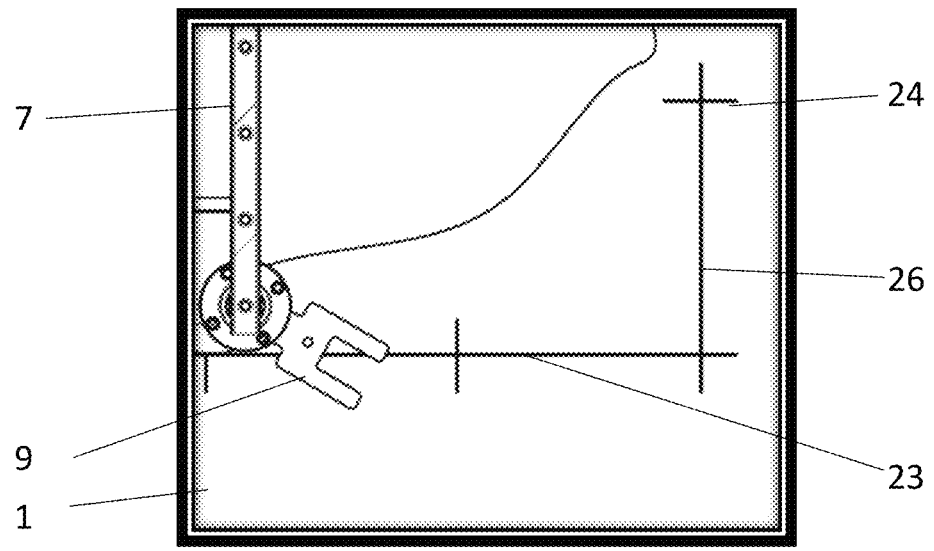
FIG. 8 shows the robot vision supervisor using the reference features on the frame to compute the absolute positions of the end effector in the plane normal to the viewing direction of camera.
Figure 9:
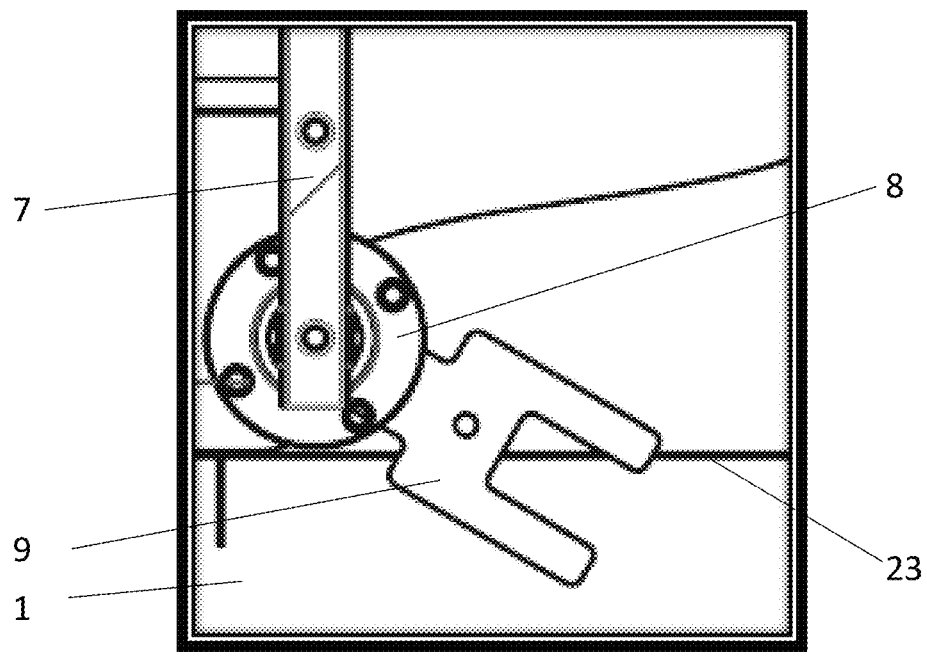
FIG. 9 shows a view of the end effector being closer to the camera and using this relative size comparison to compute end effector relative position along the viewing direction of the camera.
Figure 10:
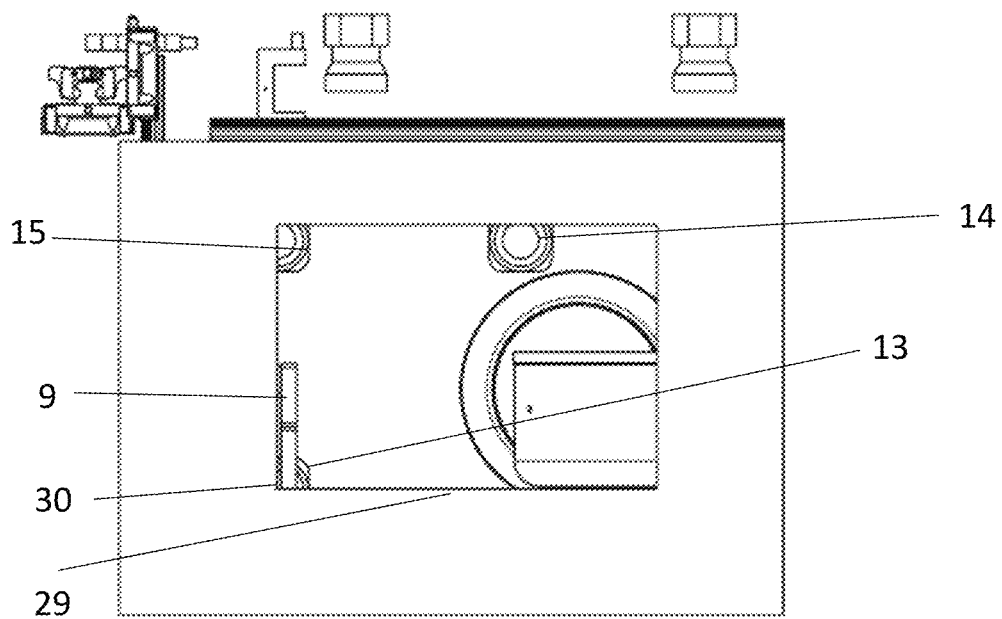
FIG. 10 shows a side view of the robot vision supervisor with an orthogonal camera to compute the relative difference in the viewing direction of the first camera utilizing a corner feature on the reference frame.
Figure 11:
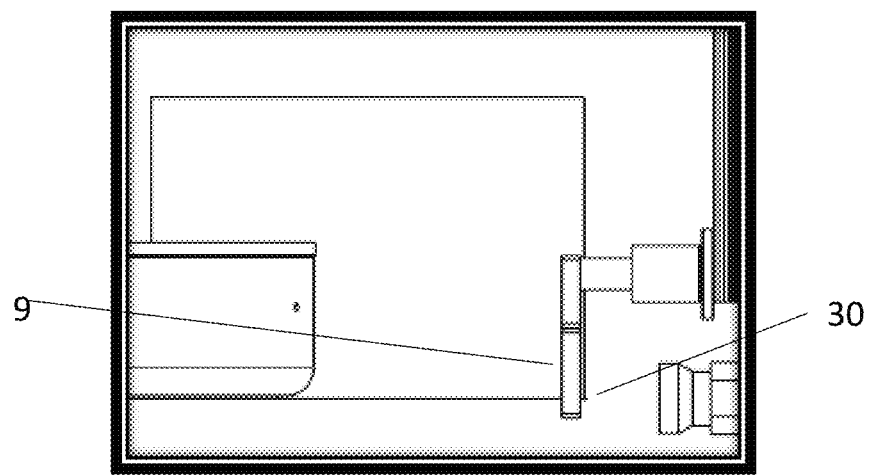
FIG. 11 shows an alternate side view as seen from the opposite viewing direction to that in FIG. 10.

As can be seen in camera viewed images FIG. 8 and FIG. 9 a single primary camera can successful compute all 3 positions and orientation. As seen in FIG. 8 two orthogonal positions axes to the view direction are computed by referencing the features 23, 24 and 26. The position along the viewing direction is computed by comparing the size of end effector 9 to that of a size at a prior known position such as home as seen in FIG. 9. Alternatively an orthogonal camera viewing in an orthogonal direction as seen in FIG. 10 and FIG. 11 can be used to compute the position along the viewing direction of the primary camera. Further a cross camera 21 can be used to improve ease of position measurement and accuracy.

Even though a single primary camera can successfully compute all positions a plurality of primary cameras is used to cover large robot motion range due to limited field of views of a single camera and image distortions causing lack of accuracy. Image stitching algorithms are employed to improve positioning accuracy between the primary and secondary camera arrays by joining the viewed images to that of adjacent cameras creating panoramic views. Further an image library of positions or a lookup table of images is stored when robot is in good calibration. This image library position lookup table is compared to compute positioning errors of traditional controls and detecting anomalies.

Although the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A robot vision supervisor comprising:
    a robot with an end effector moving along a plurality of axes with reference to a frame;
    a robot controller directing said end effector to commanded positions with reference to said frame;
    a plurality of cameras attached to said reference frame;
    at least one of said plurality of cameras viewing the said end effector and said robot controller computing current position of said end effector along one of said plurality of axes;
    wherein, said robot controller compares the said current position determined by said camera to said commanded position by said robot controller to detect any loss of referencing;
    wherein, the said cameras use image processing to extract boundaries of said robot workspace and compare with the boundaries of the said robot moving parts and said end effector to prevent collisions and guide said robot to its home position.

2. A robot vision supervisor as in claim 1, wherein the said cameras are able to detect any unidentified foreign objects other than known objects in the workspace to prevent collisions with the robot moving parts and notify the said controller of their presence.

3. A robot vision supervisor as in claim 1, wherein the said cameras are able to compare position of said end effector against reference features on said frame.

4. A robot vision supervisor as in claim 1, wherein the said cameras are able to compare position of said end effector against features on said frame.

5. A robot vision supervisor as in claim 1, wherein the said cameras are arranged in arrays and employ image stitching algorithms to improve positioning accuracy by joining the viewed images to that of adjacent said cameras.

6. A robot vision supervisor as in claim 1, wherein an image lookup table is generated against all position and orientation combinations conducted when said robot controller is known to work accurately to use for comparison when the said robot is in regular operation later.

7. A robot vision supervisor as in claim 1, further comprising:
    a plurality of primary cameras;
    a plurality of orthogonal cameras viewing in a perpendicular direction of said primary cameras.

8. A robot vision supervisor as in claim 5, further comprising:
    a plurality of cross cameras viewing in a mutually perpendicular direction of said primary cameras and said orthogonal cameras.

\* \* \* \* \*